(12) United States Patent
Gottesman et al.

(10) Patent No.: US 11,785,062 B1
(45) Date of Patent: Oct. 10, 2023

(54) SYSTEMS AND METHODS FOR ENABLING SHARED MEDIA INTERACTIONS

(71) Applicant: Meta Platforms, Inc., Menlo Park, CA (US)

(72) Inventors: Frederick Scott Gottesman, Kentfield, CA (US); Patrick Francis Keenan, Toronto (CA); Aaron Albonetti, Long Beach, CA (US); Wade Campbell, Seattle, WA (US); William Siemers, Seattle, WA (US); Annabel Strauss, New York City, NY (US); Ishwarya Venkatachalam, Atlanta, GA (US); Kevin Victor Wong, Renton, WA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 17/744,278

(22) Filed: May 13, 2022

(51) Int. Cl.
  *H04L 65/403* (2022.01)
  *H04L 67/141* (2022.01)

(52) U.S. Cl.
  CPC .......... *H04L 65/403* (2013.01); *H04L 67/141* (2013.01)

(58) Field of Classification Search
  CPC .. H04L 65/403–65/4053; H04L 67/14–67/148
  See application file for complete search history.

(56) References Cited

U.S. PATENT DOCUMENTS

| 2015/0113547 | A1* | 4/2015 | Wolf ...................... H04N 21/84 725/9 |
| 2017/0180780 | A1* | 6/2017 | Jeffries ............ H04N 21/43072 |
| 2019/0097964 | A1* | 3/2019 | Martinazzi .............. H04L 51/52 |
| 2019/0132405 | A1* | 5/2019 | Song ..................... H04L 51/043 |

FOREIGN PATENT DOCUMENTS

WO  WO-2020005277 A1 *  1/2020  ......... H04N 21/2187

* cited by examiner

*Primary Examiner* — Clayton R Williams
(74) *Attorney, Agent, or Firm* — Greenberg Traurig, LLP

(57) ABSTRACT

A computer-implemented method for enabling shared media interactions may include (i) identifying a group message thread that is composed of messages between a group of users, (ii) detecting that a user in the group of users is interacting with a media item posted in the group message thread, (iii) in response to detecting that the user is interacting with the media item, initiating a shared media interaction session in the group message thread for the media item, and (iv) notifying the group of users that the shared media interaction session is available in the group message thread. Various other methods, systems, and computer-readable media are also disclosed.

20 Claims, 11 Drawing Sheets

SYSTEMS AND METHODS FOR ENABLING SHARED MEDIA INTERACTIONS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
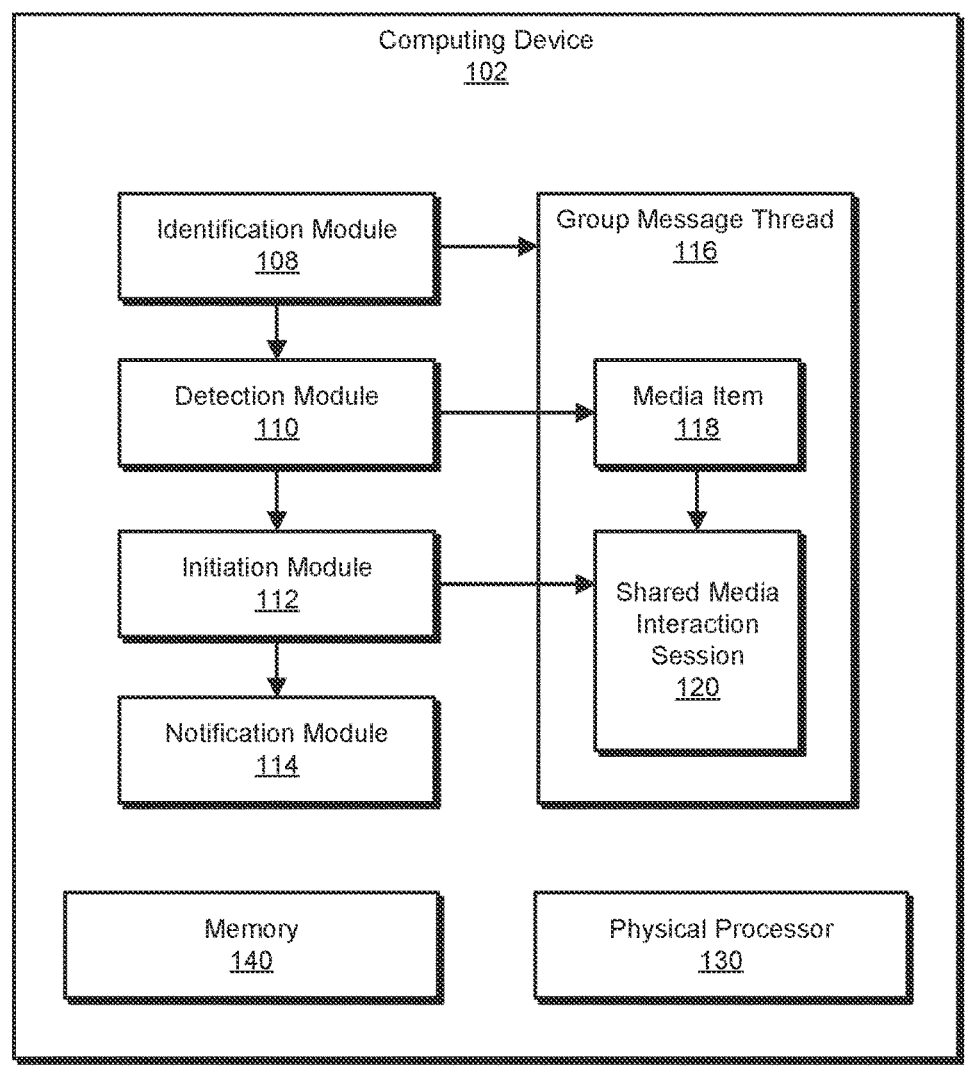
FIG. 1 is a block diagram of an exemplary system for enabling shared media interactions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

Watching a video together with friends is an enjoyable and popular experience. Scheduling a group video call to do so is less enjoyable. Rather than requiring users to create a structured or scheduled call to enjoy media together, the systems described herein may enable users to watch media together spontaneously within preexisting shared message threads. For example, if one person is watching a video that has been posted in the thread, participants in the thread may be notified that a co-watching experience is available. In some embodiments, participants may join the viewer with their microphone and camera off by default but may have the ability to activate either. In some examples, the systems described herein may enable participants to react with emotes and/or send messages that are visible in the shared media viewer. After finishing the first video or other media item, the systems described herein may enable the initiator of the shared viewer to scroll to a new media item and enable other viewers to follow along. By making shared media watching a lightweight, low-pressure experience with an easy entry point, the shared viewer may enable more frequent, enjoyable shared interactions.

In some embodiments, the systems described herein may improve the functioning of a computing device by improving the ability of the computing device to provide shared media experiences to a user of the computing device. Additionally, the systems described herein may improve the fields of persistent group communications and/or media co-watching by enabling media co-watching to take place within persistent group message threads.

Figure 2:
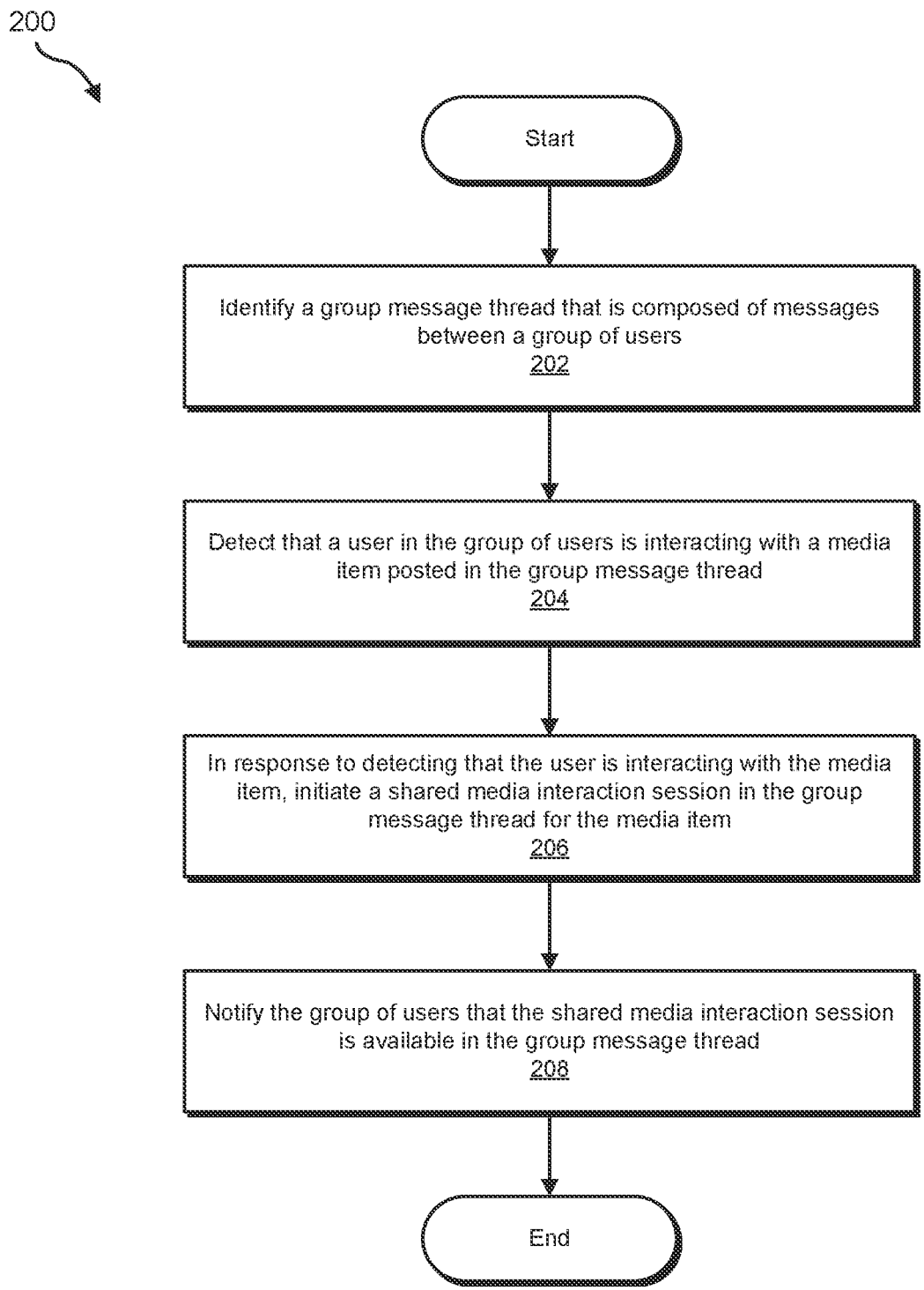
FIG. 2 is a flow diagram of an exemplary method for enabling shared media interactions.

The following will provide detailed descriptions of systems and methods for enabling shared media experiences with reference to FIGS. 1 and 2, respectively. Detailed descriptions of exemplary shared media interaction viewers in various states will be provided in connection with FIGS. 3 and 6-10. In addition, detailed descriptions of a group message thread containing a shared media interaction session will be provided in connection with FIGS. 4, 5, and 11.

In some embodiments, the systems described herein may be stored on a computing device. FIG. 1 is a block diagram of an exemplary system 100 for enabling shared media experiences. In one embodiment, and as will be described in greater detail below, a computing device 102 may be configured with an identification module 108 that may identify a group message thread 116 that is composed of messages between a group of users. In one example, a detection module 110 may detect that a user in the group of users is interacting with a media item 118 posted in group message thread 116. In response to detecting that the user is interacting with media item 118, an initiation module 112 may initiate a shared media interaction session 120 in group message thread 116 for media item 118 and a notification module 114 may notify the group of users that shared media interaction session 120 is available in group message thread 116. Although illustrated on a single computing device, in some embodiments, the systems described herein may be hosted partially on a server and partially on an endpoint computing device. In some embodiments, the computing device hosting the systems described herein may be a server. For example, the systems described herein may be hosted on a server that serves data to an endpoint computing device such as a mobile phone.

Computing device 102 generally represents any type or form of computing device capable of reading computer-executable instructions. For example, computing device 102 may represent an endpoint device such as a laptop, tablet, or mobile phone. Additional examples of computing device 102 may include, without limitation, a desktop, a wearable device, a smart device, an artificial reality device, a personal digital assistant (PDA), etc.

Group message thread 116 generally represents any digital construct that contains messages sent between a defined group of multiple users such that those messages are by default only visible to the users within the group. In some embodiments, a group message thread may primarily include text-based and/or image-based messages, such as a cellular text message group thread or an instant messaging application group thread. In some embodiments, a group message thread may be persistent such that the group message thread may continue to exist in the same state whether or not any users involved in the group message thread are online (e.g., as opposed to a video call that only exists when participants are online). In one embodiment, a group message thread may enable users to embed externally hosted media items into the group message thread and/or upload media items to the group message thread. In some examples, a group message thread may be hosted by a messenger application tied to a social media platform (e.g., the group thread may be within the messaging function of a social media platform and/or be accessed by logging in to an account that also grants access to the social media platform). In some examples, a group message thread may allow group members or add or remove other group members but may not be discoverable by users outside the group. The term social media platform, as used herein, may generally refer to any platform, website, application, and/or combination of the above designed for connecting users and sharing content.

Media item 118 may generally represent any type of digital media. In some embodiments, a media item may be a type of media that has a time-based component to interactions such that it can be experienced synchronously or asynchronously, such as a video, a game, or a text file with more content than can be simultaneously viewed in a user interface (e.g., such that scrolling through the text could be synchronized or not), rather than a type of media without a time-based component, such as a static image or a short snippet of text. In some examples, a media item may be a discrete digital media file such as a video file. In other examples, a media item may be a collection of media files compiled together such as a news article that includes images, audio, and/or video. Examples of media items may include, without limitation, videos, audio, text-based articles, and/or games. In one embodiment, a media item may be a user-uploaded video hosted on a social media platform. For example, a media item may be a short user-uploaded video and/or set of multiple user-uploaded videos hosted on a social media platform associated with the messenger application that hosts the group message thread.

Shared media interaction session 120 generally represents a non-persistent session involving a media item and one or more users that may be joined by additional users from a group message thread and enables participating users to interact with the media synchronously (e.g., watch a video synchronously). In some embodiments, a shared media interaction session may end when no users are interacting with media in the group message thread. In some examples, a shared media interaction session may enable users to change the media item that is the focus of the shared media interaction session (e.g., by advancing to the next video in a video playlist). In some embodiments, a shared media interaction session may enable users to communicate within the shared media interaction session, for example via text, emotes, audio, and/or video. In one embodiment, a shared media interaction session may have a user interface referred to as a shared media interaction viewer. In some embodiments, a shared media interaction viewer may inherent the privacy, presence, and/or audience model from the associated group message thread. Shared media interaction sessions and shared media interaction viewers will be discussed in greater detail below in connection with FIGS. 2-11.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

FIG. 2 is a flow diagram of an exemplary method 200 for enabling shared media interactions. In some examples, at step 202, the systems described herein may identify a group message thread that is composed of messages between a group of users.

The systems described herein may identify a group message thread in a variety of contexts. For example, a group message thread may be hosted by a messaging application that has a core functionality of hosting message threads. In another example, a group message thread may be hosted by a social media platform that has a core functionality of publicly or semi-privately sharing content (e.g., posts, images, videos, etc.) but also has an ancillary functionality of hosting message threads between users of the social media platform. Additionally or alternatively, a group message thread may be hosted by a messenger application that has a core functionality of hosting message threads but that is accessed via a user account that also provides access to a social media platform. In some examples, a group message thread may be between a group of users that includes two or more users and may only be visible to users within the group. In some embodiments, a group message thread may be a single ongoing conversation (as opposed to, e.g., a server with multiple channels or a social media group with multiple posts that each contain a separate conversation).

At step 204, the systems described herein may detect that a user in the group of users is interacting with a media item posted in the group message thread.

The systems described herein may detect that a user is interacting with a media item in a variety of ways and/or contexts. In one embodiment, the systems described herein may detect that a media player in the group thread is actively playing the media item. In some embodiments, the systems described herein may detect that a user has interacted with user interface (UI) elements relevant to the media item (e.g., a play button, a volume control, etc.). In one embodiment, the systems described herein may determine that a user is interacting with a media item via a media viewer.

At step 206, the systems described herein may, in response to detecting that the user is interacting with the media item, initiate a shared media interaction session in the group message thread for the media item.

The systems described herein may initiate a shared media interaction session in a variety of ways. In some embodiments, the systems described herein may initiate the shared media interaction session whenever a user interacts with a media item in a group message thread in order to seamlessly transition into a shared media interaction experience if additional users join. Alternatively, the systems described herein may launch a non-shared media player for a single user and may transition to a shared media interaction session if an additional user interacts with the media item.

Figure 3:
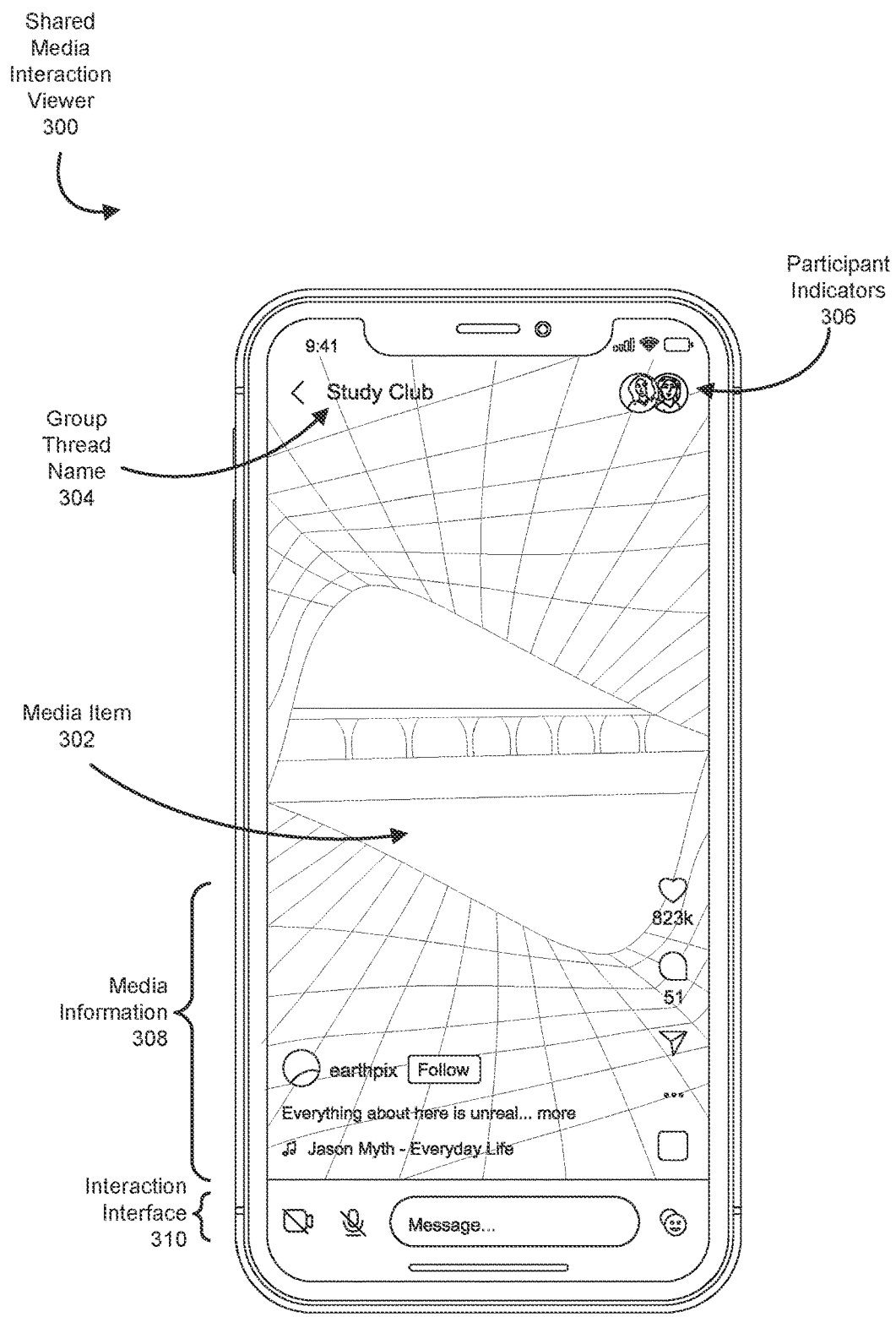
FIG. 3 is an illustration of an exemplary shared media interaction viewer.

In some embodiments, a shared media interaction session may have a UI similar to that of a non-shared media player. In other embodiments, a shared media interaction session may have a UI with different and/or additional elements compared to a non-shared media player. For example, as illustrated in FIG. 3, a shared media interaction viewer 300 may display a media item 302, as well as various other UI elements. In one embodiment, shared media interaction viewer 300 may display a group thread name 304 that enables a user to return to the group thread from the viewer. In some examples, shared media interaction viewer 300 may display participant indicators 306 that includes avatars and/or icons of users currently participating in the shared media interaction. In some embodiments, shared media interaction viewer 300 may include an overlay of media information 308, such as the user who posted the media, the title of the media, information about content of the media (e.g., a song playing), and/or social media information about the media such as the number of likes and/or shares received by the media. In one embodiment, shared media interaction viewer 300 may include an interaction interface 310 that enables a user to communicate in real time with other participants in the shared media interaction experience via text, emoticon reactions icons ("reactions"), audio, and/or video.

Returning to FIG. 2, at step 208, the systems described herein may notify the group of users that the shared media interaction session is available in the group message thread.

Figure 4:
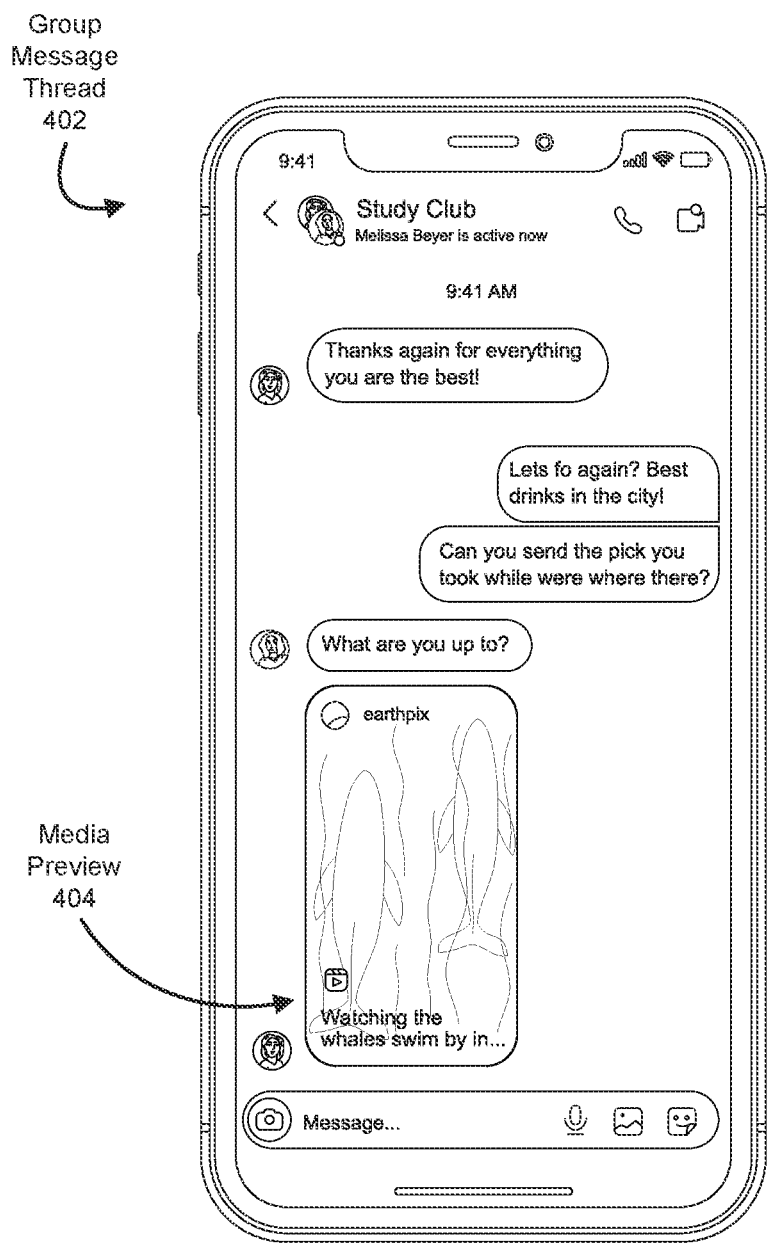
FIG. 4 is an illustration of an exemplary group message thread.

The systems described herein may notify the users in a variety of ways. In one embodiment, the systems described herein may display a notification in the group message thread. For example, as illustrated in FIG. 4, a group message thread 402 may include a media preview 404 of a media item posted to group message thread 402 by a user who is a member of the group. In some examples, media preview 404 may include the name of the media item, an image representing the media item (e.g., a still from a video, a screenshot of an article or game, etc.), an icon representing the type of media item, and/or other information about the media item.

Figure 5:
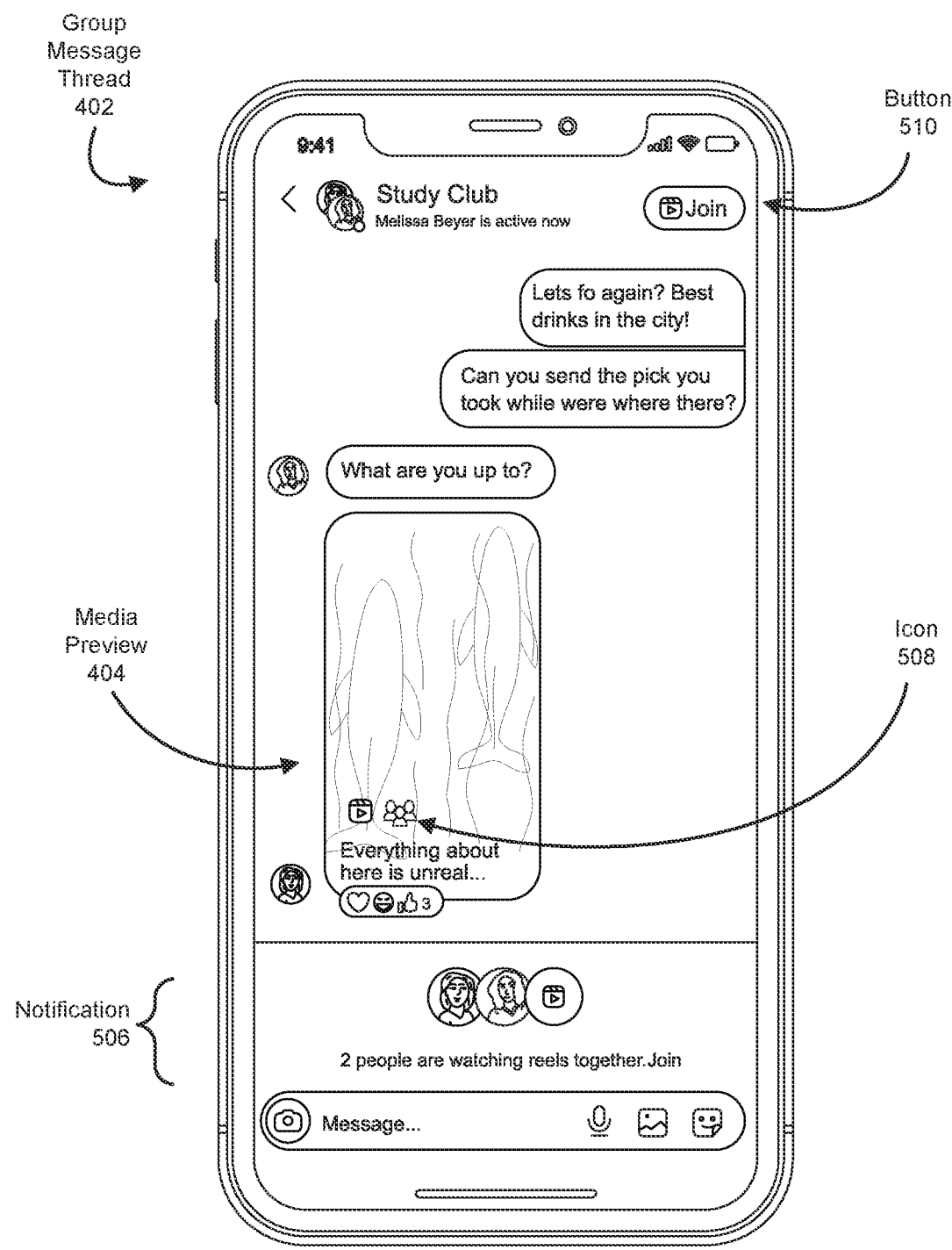
FIG. 5 is an illustration of an exemplary group message thread with an active shared media interaction session.

In one embodiment, if a user interacts with media preview 404, the systems described herein may initiate a shared media interaction session and the message thread UI may change. For example, as illustrated in FIG. 5, an icon 508 on media preview 404 may indicate that a shared media interaction session is active for the media item displayed in media preview 404. Additionally or alternatively, a notification 506 at the bottom of the group thread UI may provide information about the shared media interaction session such as the number and/or icons of current participants. In some embodiments, a notification at the top of the group thread UI may contain any or all of this information in addition or as an alternative to showing the information at the bottom of the thread. In some embodiments, notification 506 may include a UI element that enables a user to join the shared media interaction session. In addition or as an alternative, a button 510 at the top of the group thread UI may enable a user to join the shared media interaction session.

In some embodiments, the systems described herein may notify users about the shared media interaction session by adding an icon and/or other UI element to a listing of the group message thread in an inbox that includes multiple message threads. For example, the systems described herein may display a shared media interaction session icon next to the thread name in a user's inbox. Additionally or alternatively, the systems described herein may display a toast (i.e., a temporary overlay with icons and/or text that is superimposed on the active application) and/or other type of pop-up notification informing the user of the shared media interaction session.

Figure 6:
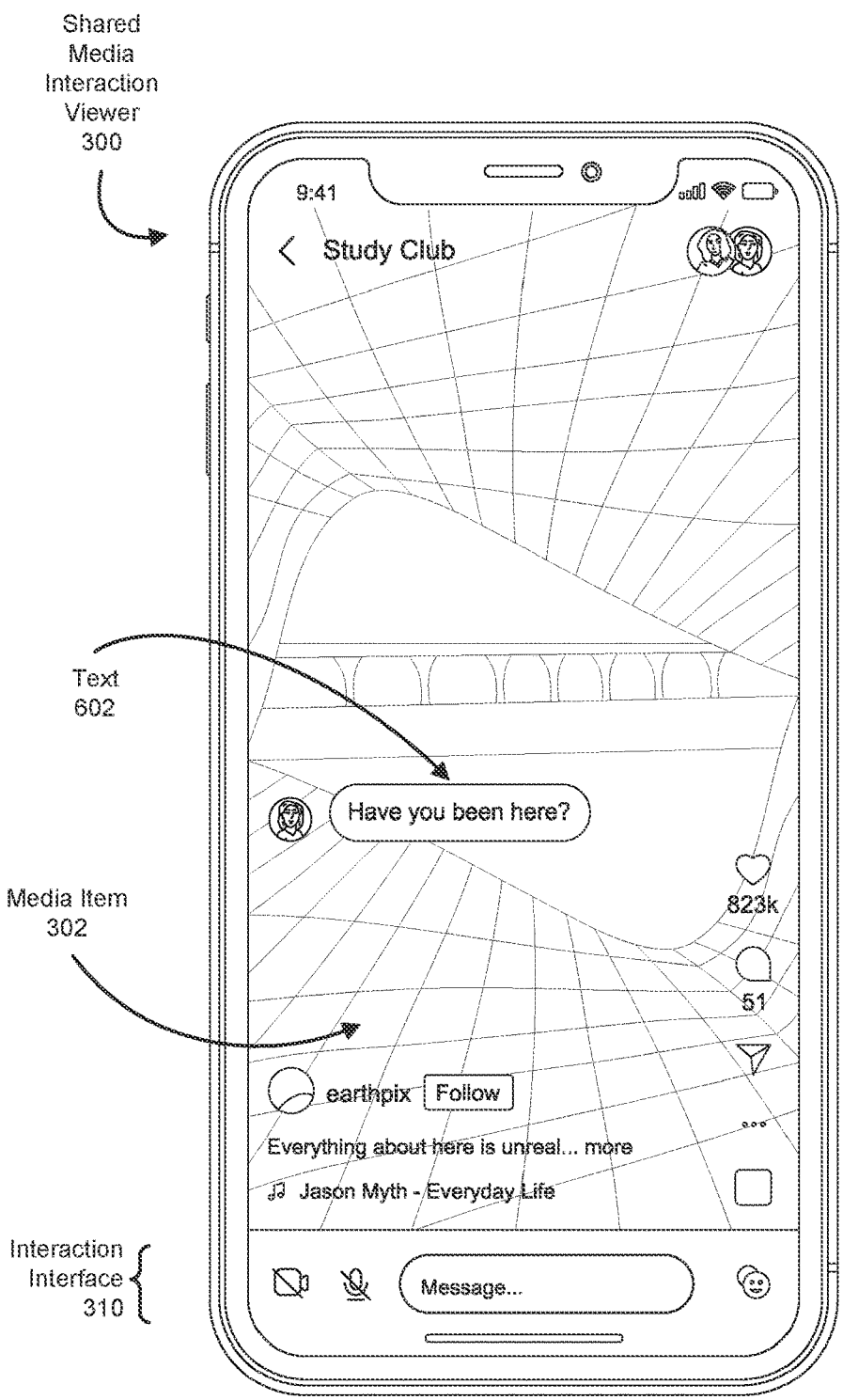
FIG. 6 is an illustration of an exemplary shared media interaction viewer.

The systems described herein may enable and/or facilitate various kinds of communication between users in a shared media interaction session. In one example, as illustrated in FIG. 6, shared media interaction viewer may display text 602 entered by a user via interaction interface 310 as a temporary overlay over media item 302. In some embodiments, text 602 may be accompanied by the user icon or avatar of the user who entered text 602. In one embodiment, the systems described herein may add text 602 to the group message thread. In some embodiments, the systems described herein may post text 602 to the group message thread as if text 602 were a text-based message sent directly to the group message thread. Additionally or alternatively, the systems described herein may visually indicate in the group message thread that text 602 is associated with media item 302.

Figure 7:
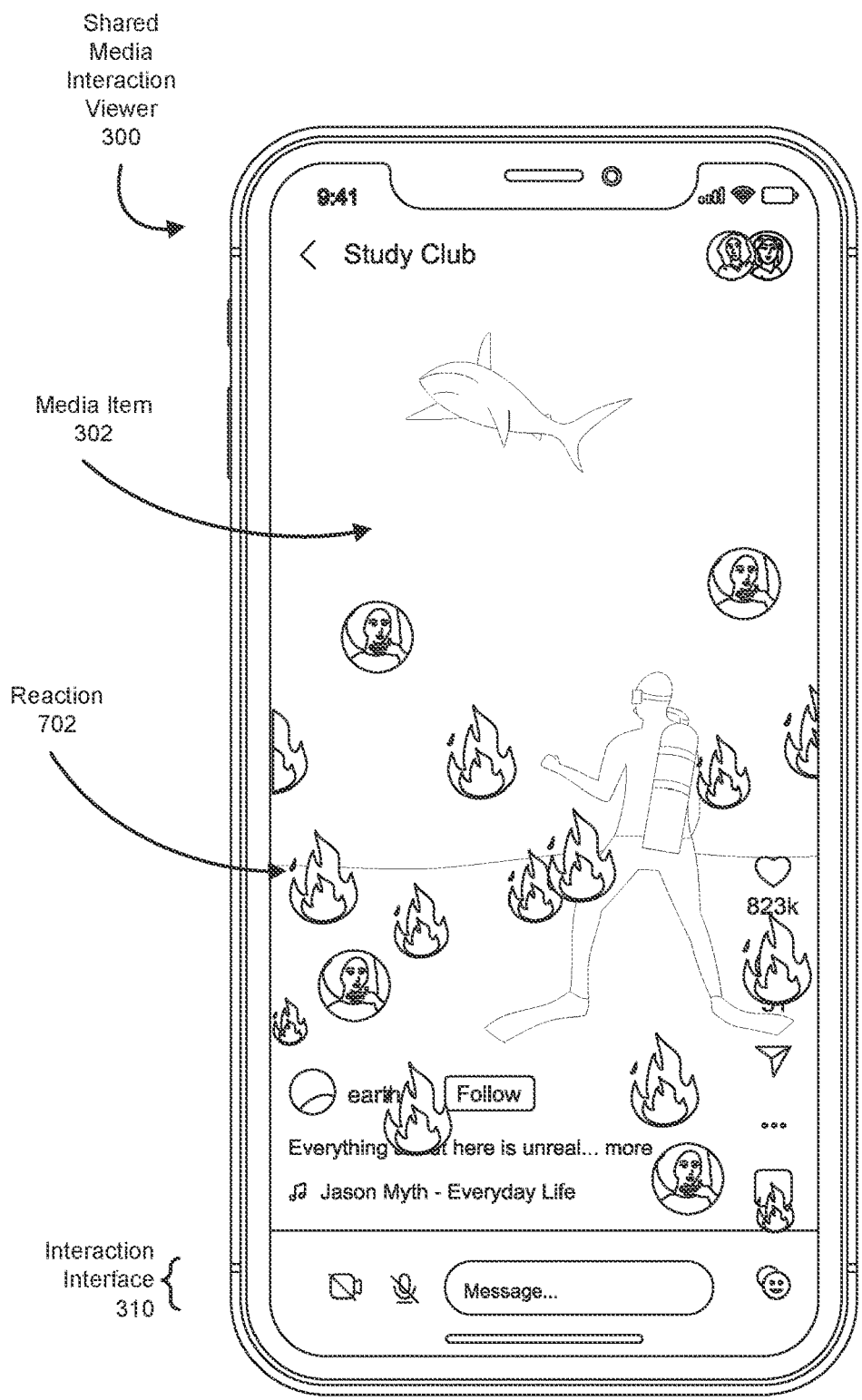
FIG. 7 is an illustration of an exemplary shared media interaction viewer.

In some examples, as illustrated in FIG. 7, shared media interaction viewer 300 may display reaction 702 entered by a user via interaction interface 310 as a temporary overlay over media item 302. In one example, the systems described herein may display multiple copies of reaction 702 floating up over media item 302 before disappearing. In some embodiments, the systems described herein may visually indicate which user entered reaction 702. For example, the systems described herein may display copies of an icon or avatar for the user who entered reaction 702 in conjunction with reaction 702. Additionally or alternatively, the systems described herein may display the icon or avatar for the user at a greater size, with a border, with an animation, and/or with an overlaid copy of reaction 702. In some embodiments, interaction interface 310 may have a reaction selection mode that displays a list of different reaction options. In one embodiment, the systems described herein may add reaction 702 as a reaction on the media preview for media item 302 in the group message thread.

In some embodiments, the systems described herein may enable users to communicate via audio and/or video in a shared media interaction session. In one embodiment, users may join shared media interaction sessions with their microphones and/or video cameras off by default, fostering a low-pressure interaction. In some embodiments, an interaction interface in the shared media interaction session may enable users to toggle microphones and/or cameras on or off. Additionally or alternatively, a shared media interaction viewer may provide users with a push-to-talk option that activates a microphone and/or camera only when a user is actively selecting an interface element. In one example, the systems described herein may capture, via a microphone (e.g., a microphone on a smartphone), audio input from a user, detect that the user has enabled audio sharing for the shared media interaction session (e.g., via toggling mute off and/or pushing to talk), and, in response to detecting that the user has enabled the audio sharing, provide the audio input to users participating in the shared media interaction session. Similarly, in one example, the systems described herein may capture, via a camera (e.g., the front-facing camera of a smartphone, the webcam of a laptop, etc.), video input from the user, detect that the user has enabled video sharing for the shared media interaction session (e.g., by toggling on video sharing), and, in response to detecting that the user has enabled the video sharing, provide the video input to users participating in the shared media interaction session.

In some embodiments, the systems described herein may enable users to set preferences about whether to accept audio and/or video from other users. For example, a user may wish to participate in a shared media interaction session silently without being abruptly distracted by audio from other users and/or from the media item. In some embodiments, the systems described herein may enable users to set global preferences that apply to all shared media interaction sessions and/or one-time preferences that apply only to the currently active session. In some embodiments, the systems described herein may enable users to accept or decline audio and/or video individually from other users in the group.

Figure 8:
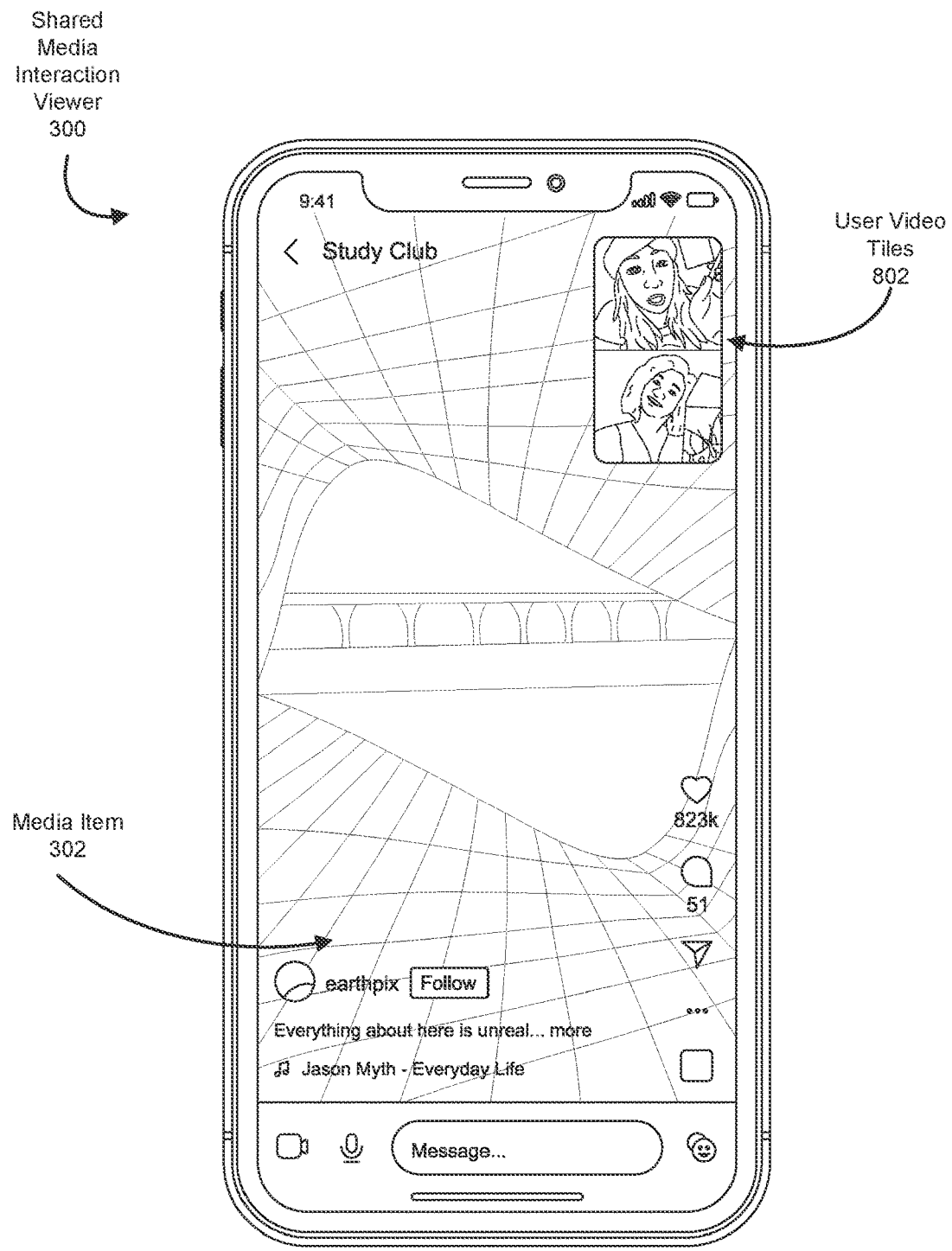
FIG. 8 is an illustration of an exemplary shared media interaction viewer.

In one embodiment, the systems described herein may update the shared media interaction viewer to reflect when users are communicating via audio and/or video. For example, a user's icon may be larger, pulse, animate, glow, and/or have a different colored border if the user is currently speaking. In one embodiment, as illustrated in FIG. 8, shared media interaction viewer 300 may display user video tiles 802 as an overlay over media item 302. In one embodiment, video tiles may replace user icons for users who are communicating via video. In some examples, some users may be communicating via audio and video while other users are communicating via audio without video and other users are communicating only via text and/or reacts.

Figure 9:
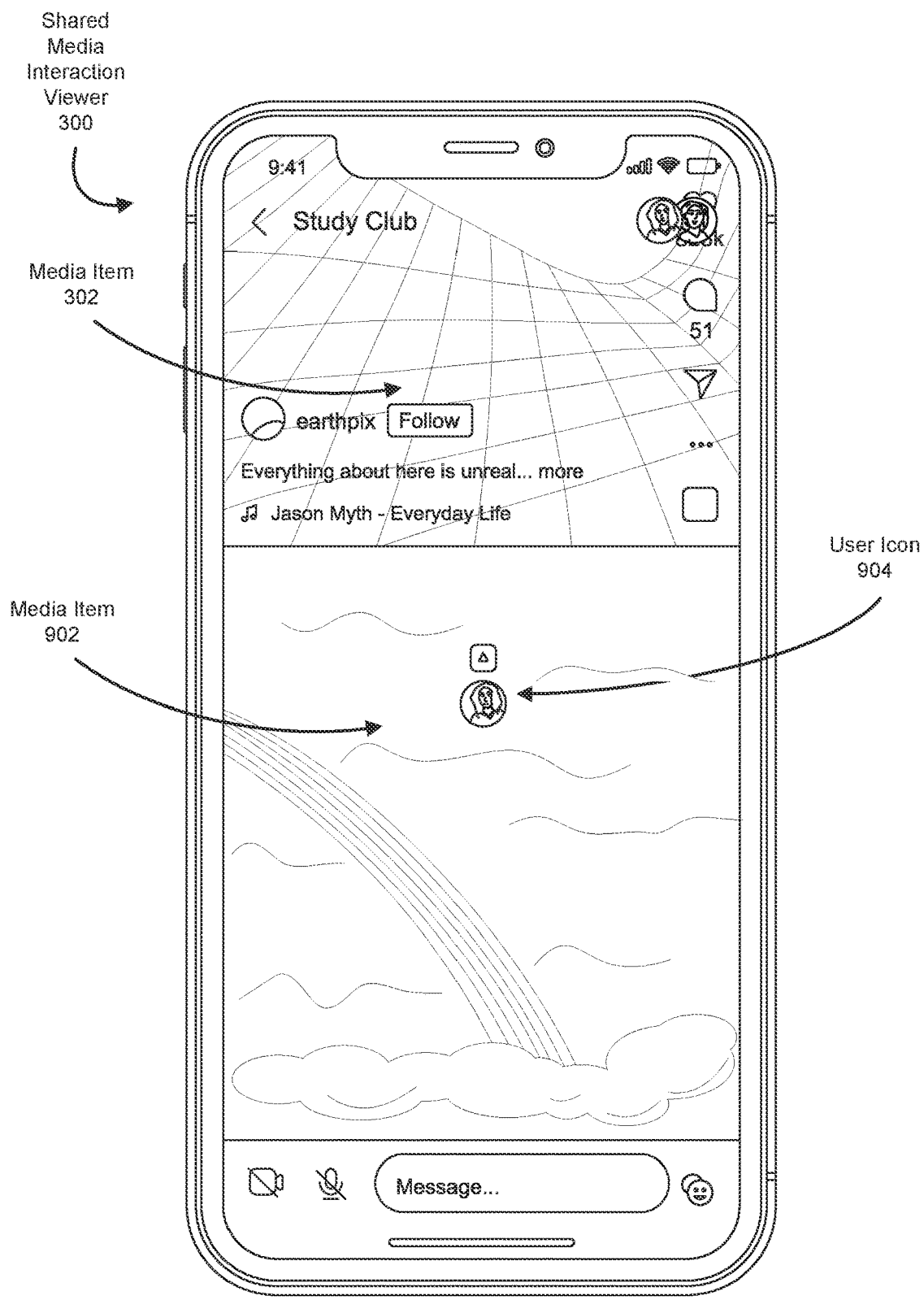
FIG. 9 is an illustration of an exemplary shared media interaction viewer.
Figure 10:
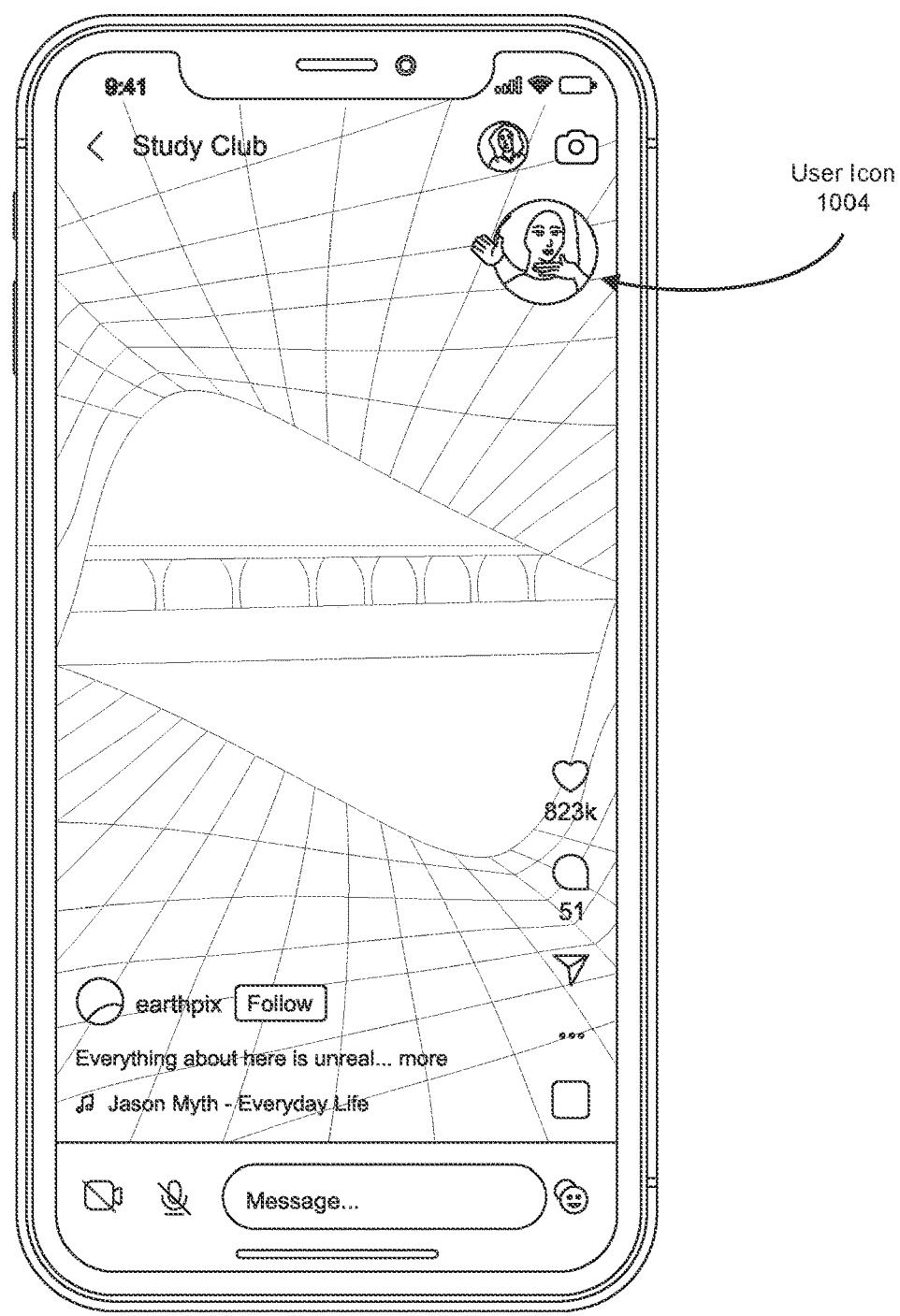
FIG. 10 is an illustration of an exemplary shared media interaction viewer.

In some embodiments, the systems described herein may enable a user to advance to a new media item within the shared media interaction session and may update the shared media interaction session to feature the new media item. For example, the systems described herein may enable a user to advance to the next video in a video playlist, return to the previous video in a video playlist, advance through a song playlist, click through to a related article, and so forth. In some embodiments, the systems described herein may only allow the initiator of the shared media interaction session to change the active media item while in other embodiments of the systems described herein may enable any user to change the active media item. In one embodiment, the systems described herein may display an animation or other visual cue indicating that a user is changing the active media item. For example, as illustrated in FIG. 9, shared media interaction viewer 300 may display an animation of media item 302 scrolling upwards and offscreen, followed by a media item 902 that will become the new active media item for the shared media interaction session. In some embodiments, shared media interaction viewer 300 may display a user icon 904 of the user who is changing the active media item. In one example, user icon 904 may appear to scroll upwards along with media item 302.

In some embodiments, the systems described herein may enable a user who joins the shared media interaction session after the session is initiated to choose whether to interact with the media from a starting point (e.g., the beginning of a video, the top of an article, etc.) or catch up and interaction synchronously with the rest of the group. In one embodiment, the shared media interaction viewer may start a new user at the starting point of the media by default but enable the user to synchronize by interacting with a UI element. For example, a user may synchronize by swiping upwards on the media item or by touching a button. In one example, the systems described herein may enable the new users to watch a video from the start or to interact with a user interface element that synchronizes the video with the rest of the group.

In some embodiments, a user who is interacting with the media asynchronously may not be part of the shared media interaction session (e.g., may not be able to communicate with participants in the session via the shared media interaction viewer) and may join the session by synchronizing the media item. In one embodiment, a user who is interacting independently with a media item in a group thread for which there is a shared media interaction session may join the shared media interaction session by interacting with a communication UI element, such as unmuting their microphone or turning on their video.

The systems described herein may display animations and/or other visual cues for a number of changes to the state of a shared media interaction session. For example, shared media interaction viewer 300 may display an extra-large version of a user icon 1004 to indicate that a user has joined the shared media interaction session. Additionally or alternatively, shared media interaction viewer 300 may animate user icon 1004, overlay user icon 1004 with an emoticon, or otherwise display a visual cue to indicate that the user represented by user icon 1004 has just joined the shared media interaction session. In some embodiments, the systems described herein may display a brief text overlay to indicate that a user has joined. Similarly, the systems described herein may animate user icon 1004 and/or display a text overlay to indicate that the associated user is leaving the shared media interaction session.

Figure 11:
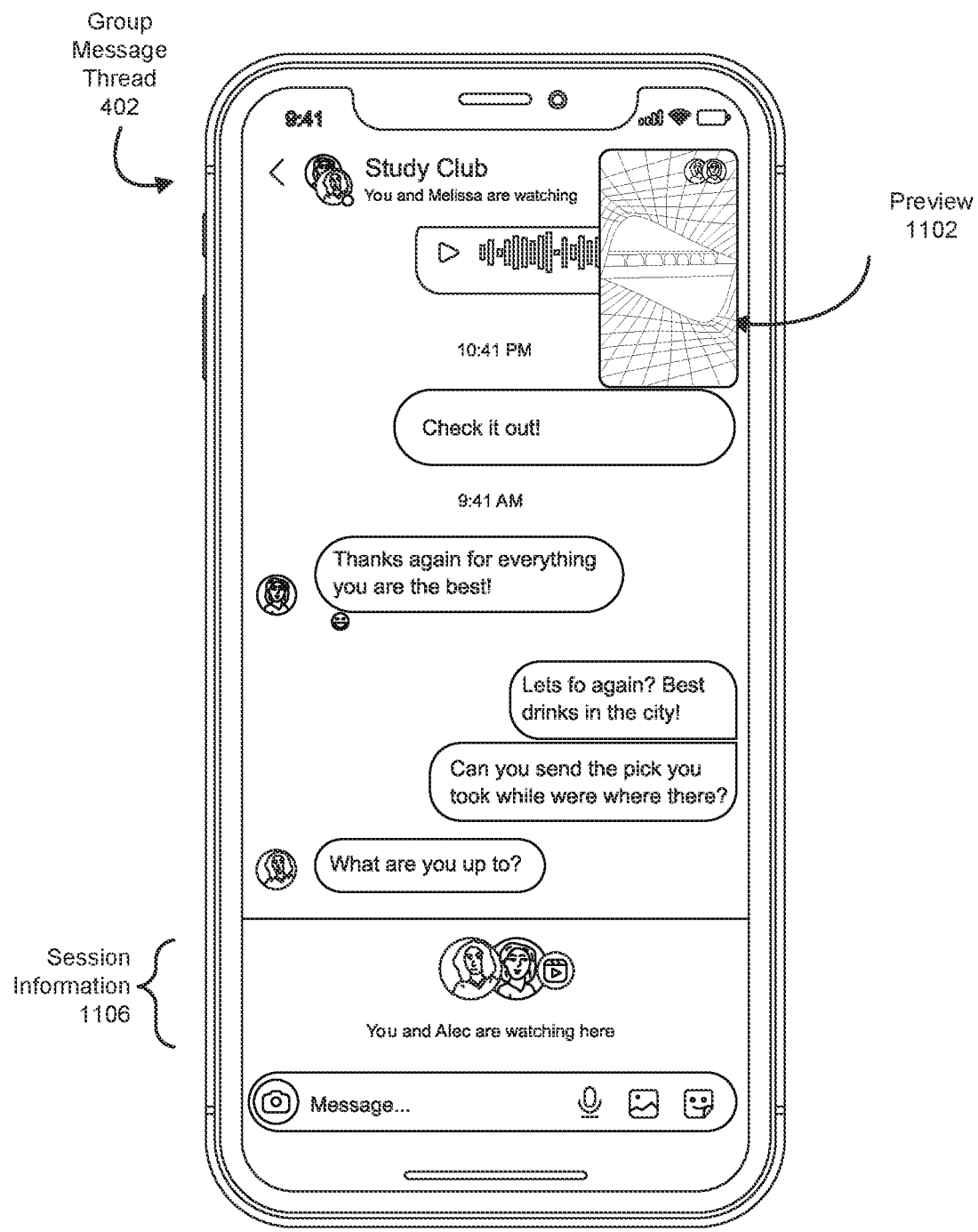
FIG. 11 is an illustration of an exemplary group message thread with an active shared media interaction session.

In some embodiments, the systems described herein may automatically remove a user from a shared media interaction session when a user leaves the shared media interaction viewer. Alternatively, the systems described herein may enable a user to stay within the shared media interaction session and may display a preview of the shared media interaction session in the UI for other parts of the application that hosts the shared media interaction session and/or over the UI of other applications. For example, as illustrated in FIG. 11, a user viewing the UI for group message thread 402 may see a preview 1102 for an ongoing shared media interaction in group message thread 402. In some embodiments, the systems described herein may display session information 1106 about the ongoing shared media interaction session, such as which users are participating. In some embodiments, the systems described herein may display a notification to a user that they are about to leave a shared media interaction session.

In some embodiments, the systems described herein may display an informational message the first time a user joins a shared media interaction session. For example, the systems described herein may explain how to communicate with other users in the shared media interaction session, what information is shared with others (e.g., whether the user's status indicator reflects that the user is participating in a shared media interaction session), and/or how to access privacy controls and/or other preferences for shared media interaction sessions. In some embodiments, the systems described herein may enable a user to access preference options and/or see information about other participating users by interacting with icons representing the users. For example, tapping the icons of users in the shared media interaction viewer may bring up a page that shows the users currently participating, the users who are eligible to join (i.e., members of the group message thread who are not currently participating), and/or preferences for the users (e.g., to mute an individual user's audio).

As described above, the systems and methods described herein may facilitate fun, low-pressure co-watching experiences by enabling users to seamlessly transition from solitary viewing of media posted to group threads into group viewing of the media. By notifying other active users when a member of a group message thread is interacting with a media item posted to the group message thread, the systems described herein may invite users to an organic, unscheduled co-watching experience that is lower pressure than a scheduled group call. In some embodiments, the systems described herein may mute microphones and video by default, further reducing the pressure to have any interactions beyond what a user is comfortable with. By enabling users to watch short videos or interact with other media together in this manner, the systems described herein may replicate the experience of passing around a phone in person in a way that is lightweight, engaging, and has a low barrier to entry.

EXAMPLE EMBODIMENTS

Example 1: A method for enabling shared media interactions may include (i) identifying a group message thread that is composed of messages between a group of users, (ii) detecting that a user in the group of users is interacting with a media item posted in the group message thread, (iii) in response to detecting that the user is interacting with the media item, initiating a shared media interaction session in the group message thread for the media item, and (iv) notifying the group of users that the shared media interaction session is available in the group message thread.

Example 2: The computer-implemented method of example 1, where the media item is hosted on a social media platform associated with a messenger app that hosts the group message thread.

Example 3: The computer-implemented method of examples 1-2, where the media item includes a user-uploaded video hosted on a social media platform.

Example 4: The computer-implemented method of examples 1-3, where the group message thread includes at least one of text-based or image-based messages.

Example 5: The computer-implemented method of examples 1-4, where the group message thread includes a persistent message thread that persists even when no users in the group of users are online.

Example 6: The computer-implemented method of examples 1-5 may further include enabling an additional user in the group of users to join the shared media interaction session.

Example 7: The computer-implemented method of examples 1-6 may further include, in response to detecting the additional user joining the shared media interaction session, displaying a notification that the additional user has joined the shared media interaction session.

Example 8: The computer-implemented method of examples 1-7 may further include enabling the user to send text-based messages that are temporarily visible to all users participating in the shared media interaction session within a user interface of the shared media interaction session.

Example 9: The computer-implemented method of examples 1-8 may further include enabling the user to select reaction icons that are temporarily visible to all users participating in the shared media interaction session within a user interface of the shared media interaction session.

Example 10: The computer-implemented method of examples 1-9, where the shared media interaction session enables users who have joined the shared media interaction session to interact with the media item synchronously.

Example 11: The computer-implemented method of examples 1-10, where the media item includes a video and the shared media interaction session enables users who have joined the shared media interaction session to watch the video synchronously.

Example 12: The computer-implemented method of examples 1-11, where the shared media interaction session enables users who join the shared media interaction session after the initiation of the shared media interaction session to watch the video from the start and interact with a user interface element that synchronizes the video.

Example 13: The computer-implemented method of examples 1-12 may further include capturing, via a microphone, audio input from the user, detecting that the user has enabled audio sharing for the shared media interaction session, and in response to detecting that the user has enabled the audio sharing, providing the audio input to users participating in the shared media interaction session.

Example 14: The computer-implemented method of examples 1-15 may further include capturing, via a camera, video input from the user, detecting that the user has enabled video sharing for the shared media interaction session, and in response to detecting that the user has enabled the video sharing, providing the video input to users participating in the shared media interaction session.

Example 15: The computer-implemented method of examples 1-14 may further include enabling the user to advance to a new media item and updating the shared media interaction session in the group message thread to feature the new media item.

Example 16: The computer-implemented method of examples 1-15, where updating the shared media interaction session in the group message thread to feature the new media item includes displaying an animation to users participating in the shared media interaction session indicating that the user is advancing to the new media item.

Example 17: The computer-implemented method of examples 1-16, where notifying the group of users that the shared media interaction session is available in the group message thread includes displaying a visual notification within the group message thread.

Example 18: The computer-implemented method of examples 1-17, where notifying the group of users that the shared media interaction session is available in the group message thread includes displaying a visual notification within a message inbox lists a plurality of message threads that includes the group message thread.

Example 19: A system for enabling shared media interactions may include at least one physical processor and physical memory including computer-executable instructions that, when executed by the physical processor, cause the physical processor to (i) identify a group message thread that is composed of messages between a group of users, (ii) detect that a user in the group of users is interacting with a media item posted in the group message thread, (iii) in response to detecting that the user is interacting with the media item, initiate a shared media interaction session in the group message thread for the media item, and (iv) notify the group of users that the shared media interaction session is available in the group message thread.

Example 20: A non-transitory computer-readable medium may include one or more computer-readable instructions that, when executed by at least one processor of a computing device, cause the computing device to (i) identify a group message thread that is composed of messages between a group of users, (ii) detect that a user in the group of users is interacting with a media item posted in the group message thread, (iii) in response to detecting that the user is interacting with the media item, initiate a shared media interaction session in the group message thread for the media item, and (iv) notify the group of users that the shared media interaction session is available in the group message thread As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive media data to be transformed, transform the media data such that it can be interacted with by multiple users synchronously, output a result of the transformation to launch a shared media viewer, use the result of the transformation to play the media in a shared media viewer, and store the result of the transformation to a message log. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying a group message thread that comprises messages between a group of users;
    detecting that a user in the group of users is interacting with a media item posted in the group message thread;
    in response to detecting that the user is interacting with the media item, initiating a shared media interaction session in the group message thread for the media item; and
    notifying the group of users that the shared media interaction session is available in the group message thread.

2. The computer-implemented method of claim 1, wherein the media item is hosted on a social media platform associated with a messenger app that hosts the group message thread.

3. The computer-implemented method of claim 1, wherein the media item comprises a user-uploaded video hosted on a social media platform.

4. The computer-implemented method of claim 1, wherein the group message thread comprises at least one of text-based or image-based messages.

5. The computer-implemented method of claim 1, wherein the group message thread comprises a persistent message thread that persists even when no users in the group of users are online.

6. The computer-implemented method of claim 1, further comprising enabling an additional user in the group of users to join the shared media interaction session.

7. The computer-implemented method of claim 6, further comprising, in response to detecting the additional user joining the shared media interaction session, displaying a notification that the additional user has joined the shared media interaction session.

8. The computer-implemented method of claim 1, further comprising enabling the user to send text-based messages that are temporarily visible to all users participating in the shared media interaction session within a user interface of the shared media interaction session.

9. The computer-implemented method of claim 1, further comprising enabling the user to select reaction icons that are temporarily visible to all users participating in the shared media interaction session within a user interface of the shared media interaction session.

10. The computer-implemented method of claim 1, wherein the shared media interaction session enables users who have joined the shared media interaction session to interact with the media item synchronously.

11. The computer-implemented method of claim 1, wherein:
the media item comprises a video; and
the shared media interaction session enables users who have joined the shared media interaction session to watch the video synchronously.

12. The computer-implemented method of claim 11, wherein the shared media interaction session enables users who join the shared media interaction session after the initiation of the shared media interaction session to:
watch the video from the start; and
interact with a user interface element that synchronizes the video.

13. The computer-implemented method of claim 1, further comprising:
capturing, via a microphone, audio input from the user;
detecting that the user has enabled audio sharing for the shared media interaction session; and
in response to detecting that the user has enabled the audio sharing, providing the audio input to users participating in the shared media interaction session.

14. The computer-implemented method of claim 1, further comprising:
capturing, via a camera, video input from the user;
detecting that the user has enabled video sharing for the shared media interaction session; and
in response to detecting that the user has enabled the video sharing, providing the video input to users participating in the shared media interaction session.

15. The computer-implemented method of claim 1, further comprising:
enabling the user to advance to a new media item within the shared media interaction session; and
updating the shared media interaction session in the group message thread to feature the new media item.

16. The computer-implemented method of claim 15, wherein updating the shared media interaction session in the group message thread to feature the new media item comprises displaying an animation to users participating in the shared media interaction session indicating that the user is advancing to the new media item.

17. The computer-implemented method of claim 1, wherein notifying the group of users that the shared media interaction session is available in the group message thread comprises displaying a visual notification within the group message thread.

18. The computer-implemented method of claim 1, wherein notifying the group of users that the shared media interaction session is available in the group message thread comprises displaying a visual notification within a message inbox that lists a plurality of message threads that comprises the group message thread.

19. A system comprising:
at least one physical processor;
physical memory comprising computer-executable instructions that, when executed by the physical processor, cause the physical processor to:
identify a group message thread that comprises messages between a group of users;
detect that a user in the group of users is interacting with a media item posted in the group message thread;
in response to detecting that the user is interacting with the media item, initiate a shared media interaction session in the group message thread for the media item; and
notify the group of users that the shared media interaction session is available in the group message thread.

20. A non-transitory computer-readable medium comprising one or more computer-readable instructions that, when executed by at least one processor of a computing device, cause the computing device to:
identify a group message thread that comprises messages between a group of users;
detect that a user in the group of users is interacting with a media item posted in the group message thread;
in response to detecting that the user is interacting with the media item, initiate a shared media interaction session in the group message thread for the media item; and
notify the group of users that the shared media interaction session is available in the group message thread.

* * * * *